United States Patent
Rosanova

[19]

[11] Patent Number: 6,134,997
[45] Date of Patent: Oct. 24, 2000

[54] TUBE CUTTER AND METHOD

[76] Inventor: Rudolph P. Rosanova, P.O. Box 95-554, Hoffman Estates, Ill. 60195-0554

[21] Appl. No.: 08/848,609

[22] Filed: Apr. 29, 1997

[51] Int. Cl.[7] .................................................. B23D 21/08
[52] U.S. Cl. ..................................... 82/92; 7/157; 30/102
[58] Field of Search ............................. 82/59, 70, 70.2, 82/92, 94, 101; 7/157, 158; 30/96, 97, 102, 101

[56] References Cited

U.S. PATENT DOCUMENTS

| | | | |
|---|---|---|---|
| 1,505,205 | 8/1924 | Kilgour | 30/102 |
| 1,679,225 | 7/1928 | Merrifield | 30/102 |
| 1,758,521 | 5/1930 | Kerrigan | 30/102 |
| 2,629,926 | 3/1953 | Franck | 30/102 |
| 4,611,358 | 9/1986 | Mills et al. | 7/157 |
| 4,953,292 | 9/1990 | Tobey | 30/97 |
| 5,088,196 | 2/1992 | Fukuda | 30/102 |
| 5,315,759 | 5/1994 | Mashata | 30/102 |

*Primary Examiner*—A. L. Pitts
*Assistant Examiner*—Mark Williams
*Attorney, Agent, or Firm*—Paul H. Gallagher

[57] ABSTRACT

Hand held tool having a pair of gripper rollers and a cutter roller, all of which grip and hold the tube to be cut. An electric motor in the casing drives the gripper rollers and rotates the tube. A second motor in the casing moves the cutter roller into cutting engagement with the tube. The second motor also moves the cutter to accommodate different size tubes. The motors are manipulated by the hand of the operator.

11 Claims, 2 Drawing Sheets

TUBE CUTTER AND METHOD

FIELD OF THE INVENTION

The invention resides in the field of cutting tubes and pipes, and more specifically, cutting indeterminate lengths into shorter pieces and lengths. The invention includes apparatus and method.

The device of the invention finds best use in installing and fitting tubing and pipes in a structure, on the scene where the operator would cut each length of tubing and pipe as it is to be put in position in the structure, although it is of course usable in a shop for example where also greater facilities are accessible.

The device of the invention is a tool of hand-held type, and to that extent manually operable, but it is power operated, and thus less than completely manually operated.

In the operation of the tool, the tool rotates the tube being cut, and thereby eliminates the requirement for manually swinging the tool about the axis of the tube.

The tool includes means for gripping the tube and rotating it, and a cutter element that, in addition to performing the cutting function, assists in gripping the tube and holding it, and the power means is operable for advancing the cutter element against the tube. The gripping means includes a pair of gripper rollers with which the cutter element cooperates to grip the tube. The gripper rollers are circumferentially in line, and are of great length in axial direction for providing intense and accurate holding effect.

In the case of at least certain kinds of tube, the cutting step produces burrs on the tube, and the tool includes a reamer for removing the burrs, in a very simple step, and utilizing the same power means that is utilized for the cutting step itself.

A further feature is that because of the foregoing feature, the tube can be cut extremely rapidly.

Still another feature is that the tool is self contained, that is, it includes the power means, in a preferred form, but the scope of the invention is such that it generically covers power means deriving its power from an outside source.

BRIEF DESCRIPTION OF THE INDIVIDUAL FIGURES OF THE DRAWINGS

DETAILED DESCRIPTION OF THE DRAWINGS

Figure 1:
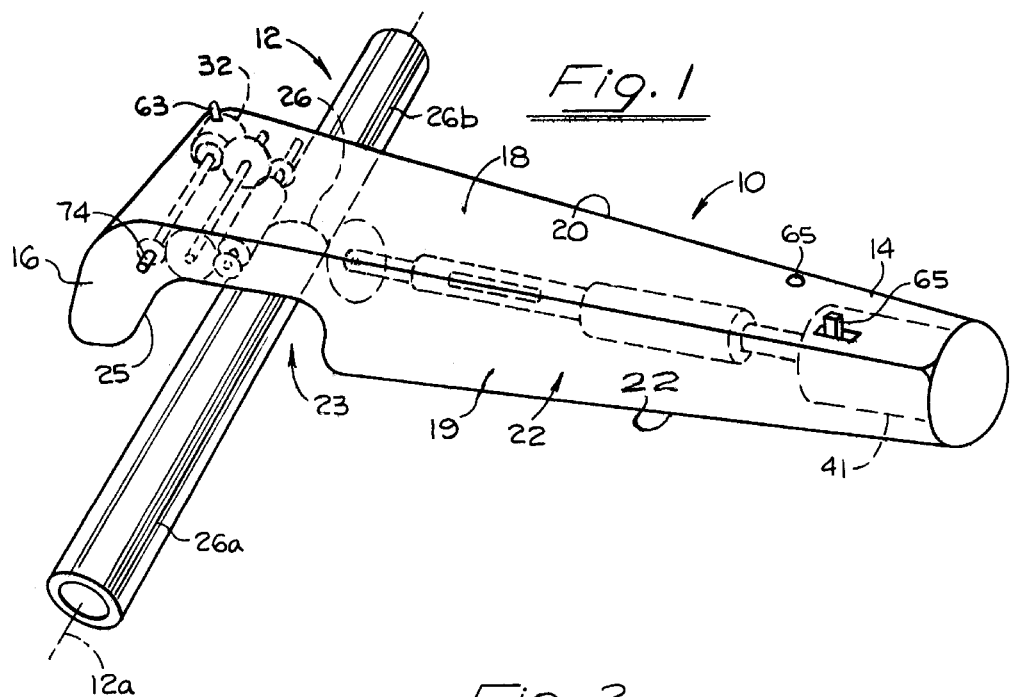
FIG. 1 is a perspective view, semi-diagrammatic in nature, of the tool of the invention applied to a tube to be cut.

In FIG. 1 the tool is indicated in its entirety at 10, and the tube to be cut at 12, the latter having a longitudinal axis 12a. The tool is utilized for cutting tubing and pipes, and it found most useful in carpentry, water systems, electricity trade, but is not limited thereto. As used herein, tube and tubing are to be interpreted broadly to cover pipe. Examples of tubing and pipe for which the tool is best used are copper tubing, black pipe, thin wall tubing for electrical conduit, among others.

The tool 10, in its entirety, includes a rear end or handle end 14, and a front end or head end 16. For convenience in considering the drawings, the tool is described as oriented in FIGS. 1 and 2, having a top side 18, a left side 19, a right side 20, and an under side 21. FIG. 1 is semi-diagrammatic in nature, devoid of most details, for facilitating consideration of its main features.

The tool includes an outer semi-enclosing casing or housing 22 with an interior space 23, and includes notches 25 in the sides, establishing a passage transversely through the interior space and thus through the casing. The tube 12, as referred to in detail hereinbelow, in the operation of the tool, extends through the notches and the interior space, where the individual operating elements of the tool engage the tube.

The tube 12, as situated and positioned in FIG. 1, is to be cut along a line 26, thus forming a short piece 26a, cut from the aggregate identified 26b. The aggregate 26b is thus left for future use, and the cut piece 26a to be used in the immediate step of construction.

Figure 2:
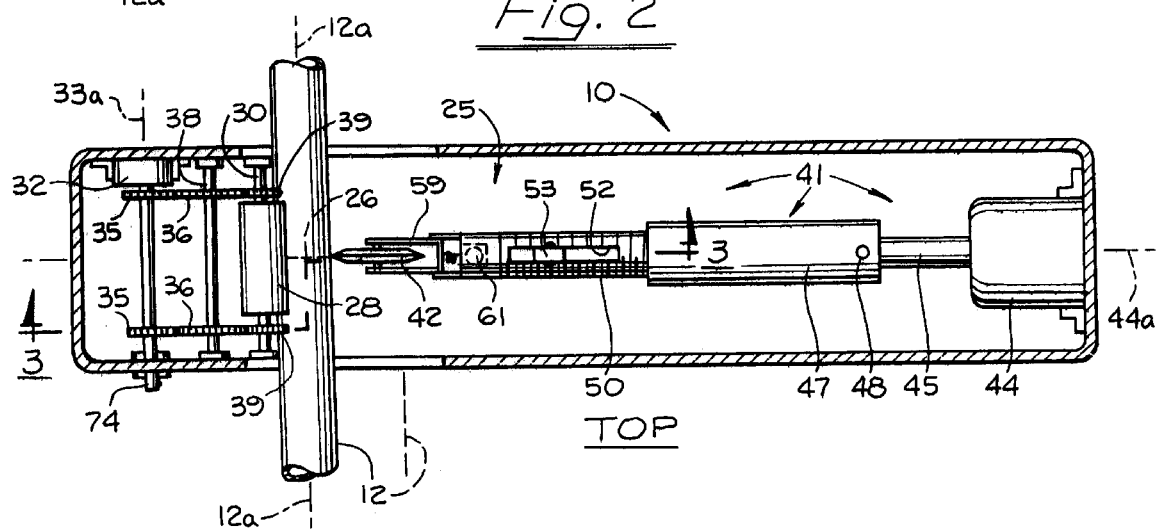
FIG. 2 is a diagrammatic view from the top, with the top element of the casing removed.

Attention is directed to FIG. 2 which is mostly diagrammatic in nature. This view is from the top and shows the elements shown in FIG. 1, but with additional elements.

The internal working elements of the tool include a pair of gripper rollers 28, 29 mounted on shafts 30, 31 having axes 30a, 31a, themselves mounted in the casing of the tool.

A drive motor 32 is mounted in the interior space 25, and has a drive shaft 33 with an axis 33a on which a drive gear 35 is mounted. The drive shaft 33, the shafts 30, 31, are parallel with the tube axis 12a when the tool is applied to the tube. As interpreted herein, those axes are effectively parallel, because of possible slight bending of the axis 12a. Mounted on the drive shaft 33 are gears 35 which mesh with idler gears 36 mounted on a shaft 38 which is also mounted in the casing.

The shafts 30, 31 have driven gears 39, 40 thereon for driving the shafts 30, 31 and thus the gripper rollers 28, 29.

Figure 3:
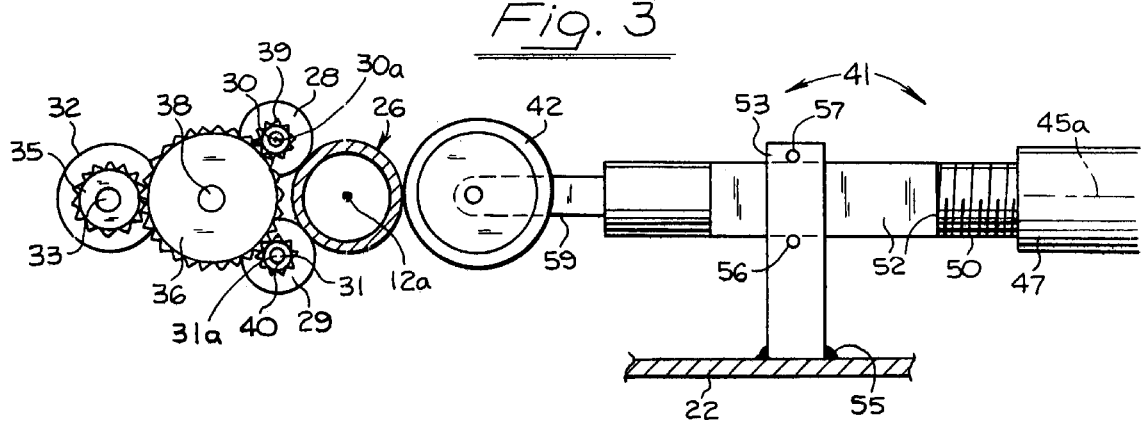
FIG. 3 is a view taken at line 3—3 of FIG. 2 on an enlarged scale.

The gripper rollers 28, 29, are aligned circumferentially and engage the tubing when the tool is applied thereto. The rollers have high friction peripheral surfaces and are of great length axially for gripping the tube over extensive lengths, for providing great holding effect, for rotating or driving the tube. They cooperate with the cutter roller for holding the tube in the cutting step. Preferably they are so arranged that they are bisected by the plane of the cutting edge of the cutter roller. Referring to FIG. 3, the gripper rollers are necessarily spaced apart angularly about the axis 12a of the tubing, for purposes of holding the tube, as referred to. Upon rotation of the drive motor 32, acting through the gears 35, 36, 39, 40, the motor rotates the tube.

Mounted in the tool and extending into the handle end, is an assembly or unit indicated in its entirety at 41, which includes a cutter element 42. This cutter element is in the form of a disc, having a sharp peripheral cutting edge, of a type known in pipe cutters. This cutter element is referred to herein as a cutter roller, whereby roller is generic to the driving rollers 28 and this cutter element. The assembly 41 includes a reversible motor 44 having a drive shaft 45. The motor is mounted on the rear wall of the casing with the shaft axis 45a extending longitudinally through the tool.

A sleeve 47 is fitted on the drive shaft and secured thereto as indicated at 48 for rotation therewith. The sleeve 47 is internally threaded.

A front shaft 50 is externally threaded, and is threaded into the front end of the sleeve 47. The shaft 50 has a longitudinal slot 52, extending vertically therethrough, which receives a finger 53 in the form of a flat blade. This finger is rigidly secured to the casing of the tool as indicated at 55, and retains the shaft 50 against rotation, and against transverse movement. The finger 53 also retains the shaft 50 against vertical movements by suitable means, shown here as pins 56, 57.

The cutter roller or element 42, identified above, is mounted for free rotation in a cage 59 including a pair of forwardly extending side blades. This cage is secured to the shaft 50, held against rotation, but carried with the shaft. A compression spring 61 is interposed, in a suitable manner, between the shaft 50 and the cage 59 to yield when the cutter roller is pushed by the shaft, against the tube, yielding rearwardly against the shaft.

Upon operation of the motor 44, the sleeve 47 is of course rotated, but the shaft 50 is held against rotation, as noted, and the threaded interconnection between those latter two members results in the shaft moving further into, or further out of, the sleeve for consequent controlling the movement of the cutter roller 42 against the tubing.

The tool is intended for use with tubing or pipe of various sizes, including for example as ¾" OD to 3" OD. FIG. 2 shows at 63 the innermost side or front side of such tubing of greater dimensions. It will be understood that the dimensions mentioned are not limiting but suggestive. In all cases the cutter roller must be retracted sufficiently to receive the tube, whatever its diameter is, between the gripper rollers and the cutter roller, and for this purpose the motor 44 is actuated in the proper direction to withdraw the cutter roller, to the right (FIGS. 2, 3), sufficiently to receive the tubing, which in the case indicated, would be at least as far as the indicator line 63.

The operator, after considering the dimension of the tube to be cut, retracts the cutter roller 42 to the proper position, and then fits the tool over the tube as shown in FIG. 1. He then actuates the motor 44 for driving the shaft 50 axially forwardly, to the left, FIGS. 2, 3, to bring the cutter roller into engagement with the tube, and this last step is continued until the gripper rollers 28 also engage the tube, that is, the tool in its entirety may be moved bodily to move the gripper rollers against the tube, or actually move the tube against the gripper rollers.

As the next step, the motor 32 is actuated for driving the gripper rollers, which rotate the tube. The cutter roller 42 is thereby rotated, this roller being free, moving in the cage 59, and the operator then in continuing the cutting operation actuates the motor 44 to constantly force the cutter roller against the tubing until the tubing is cut through.

The circumferentially adjacent rollers, 28, 29, and 42, are spaced circumferentially at angles each less than 180° to provide a cradling effect for gripping and holding the tube.

Figure 6:
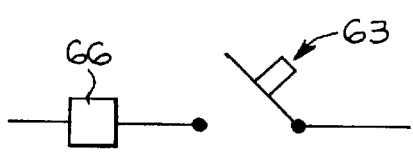
FIG. 6 is a switch means for one of the motors used in the tool.
Figure 7:
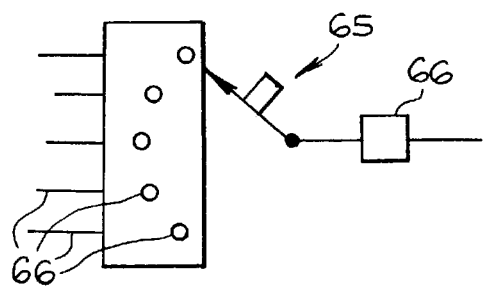
FIG. 7 is a switch for controlling another of the motors of the tool.

The tool is provided with switches of convenient character and positioning, as indicated in FIGS. 6 and 7. A switch 63 (FIGS. 1, 6) actuates the drive motor 32. This motor 32 is of constant speed, and in the cutting operation it is suitable that it be turned on and left on throughout the cutting operation.

In the case of the motor 44, a switch means 65 (FIGS. 1, 7) is utilized, for actuating and controlling this motor. This motor as indicated above is reversible, and it is of variable speed. The switch 65 shows for example five outlet contacts 66 for driving the motor 44 at correspondingly different speeds. In the case of running the cutter roller 42 forwardly into engagement with the tubing, and rearwardly away from the tube, it is desired that fast action take place. However, in the cutting step, as the groove so cut deepens, it is desired that the cutter roller be advanced in smaller increments corresponding to the speed of the cutting step. FIG. 7 also shows a reversing switch means 66 of known type, for controlling the direction of rotation of the motor 44.

Figure 4:
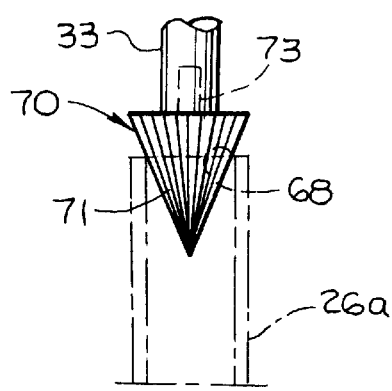
FIG. 4 is a side view of a reamer utilized in the tool.
Figure 5:
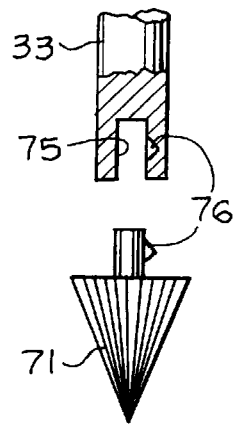
FIG. 5 is a detail view of a shaft with the reamer of FIG. 4 also shown.

As referred to above in certain cases, a burr is formed on the tube on the inner edge as indicated at 68 in FIG. 4. To remove this burr, the device includes a reamer 70 which includes a conical reaming element 71 on a stub shaft 73. The drive shaft 33 (FIG. 2) of the drive motor 32 has a distal end 74 extending to the exterior, which includes an axial cavity 75 (FIG. 5). The stub shaft 73 is inserted into that cavity, and releasable detent means 76 is provided for releasably holding the reamer in place.

After the piece 26*a* is cut off, the operator then applies the reamer to the burr on that piece, and removes it. It is so removed in a matter of seconds. It is within the scope of the invention that the reamer can be mounted on the shaft in fixed position, but it is preferred that it be detachable.

What is claimed is:

1. A device constituting a tube cutter for cutting a tube having a central longitudinal axis, comprising:

a hand tool having a handle at one end, and a head at the other end, a pair of gripper rollers and a cutter roller mounted in the head end, all the rollers being on axes all effectively parallel with the tube axis, all the rollers being mutually arranged for engaging the tube at points spaced around the tube and when so engaging the tube, each two circumferentially adjacent rollers being spaced apart angularly at less than 180°, whereby the rollers are capable of holding the tube, power means for rotating the gripper rollers and thereby rotating the tube about its own axis, and power means for moving the cutter roller toward and from the gripper rollers, whereby, rotation of the tube with the cutter roller in engagement therewith, results in cutting the tube.

2. A device according to claim 1 wherein, the device includes a casing, and both of the power means are self-contained and incorporated in the casing, thereby rendering the device a self-contained device.

3. A device according to claim 1 wherein, the hand tool has a longitudinal axis therethrough from the handle end to the head end, the gripper rollers are fixed in location on opposite sides of the longitudinal tool axis, the cutter roller is movable along said longitudinal tool axis toward and from the gripper rollers.

4. A device according to claim 3 wherein, the power means for rotating the gripper rollers includes a first motor in the head end operable on an axis effectively parallel with the tube axis, and the first motor is operable for rotating the gripper rollers and thereby rotating the tube.

5. A device according to claim 4 wherein, the first motor has an operating shaft extending transversely of the tool and with a distal end extending to the exterior of the tool, and the device includes a reamer mounted on said distal end of the shaft positioned for removing burrs from a piece of the tube.

6. A device according to claim 5 and including, means for detachably mounting the reamer on said shaft.

7. A device according to claim 3 wherein, the power means for moving the cutter roller includes a second motor, and separate, in the handle end operable for so moving the cutter roller.

8. A device according to claim 7 wherein, the second motor has a drive shaft with an internally threaded sleeve thereon, the tool includes an externally threaded shaft mounted in the sleeve, means for retaining the externally threaded shaft against rotation and against transverse displacement, the cutter roller being mounted on the externally threaded shaft and carried longitudinally thereby, and the second motor is of variable speed character.

9. A device according to claim 1 wherein, the device includes a casing having an under side, the casing has a head with an interior space, and notches at the sides forming a transverse passage through the interior space and thereby through the tool, whereby to enable the tool to be applied by relatively moving the tube into position in the interior space and extending transversely through said notches.

10. A device according to claim 1 wherein, the gripper rollers are aligned circumferentially around the tube, are of substantial axial length, and of uniform diameter throughout their length.

11. A device according to claim 10 wherein, the gripper rollers are so arranged that they are bisected by the plane containing the cutting edge of the cutter roller.

* * * * *